Patented June 4, 1940

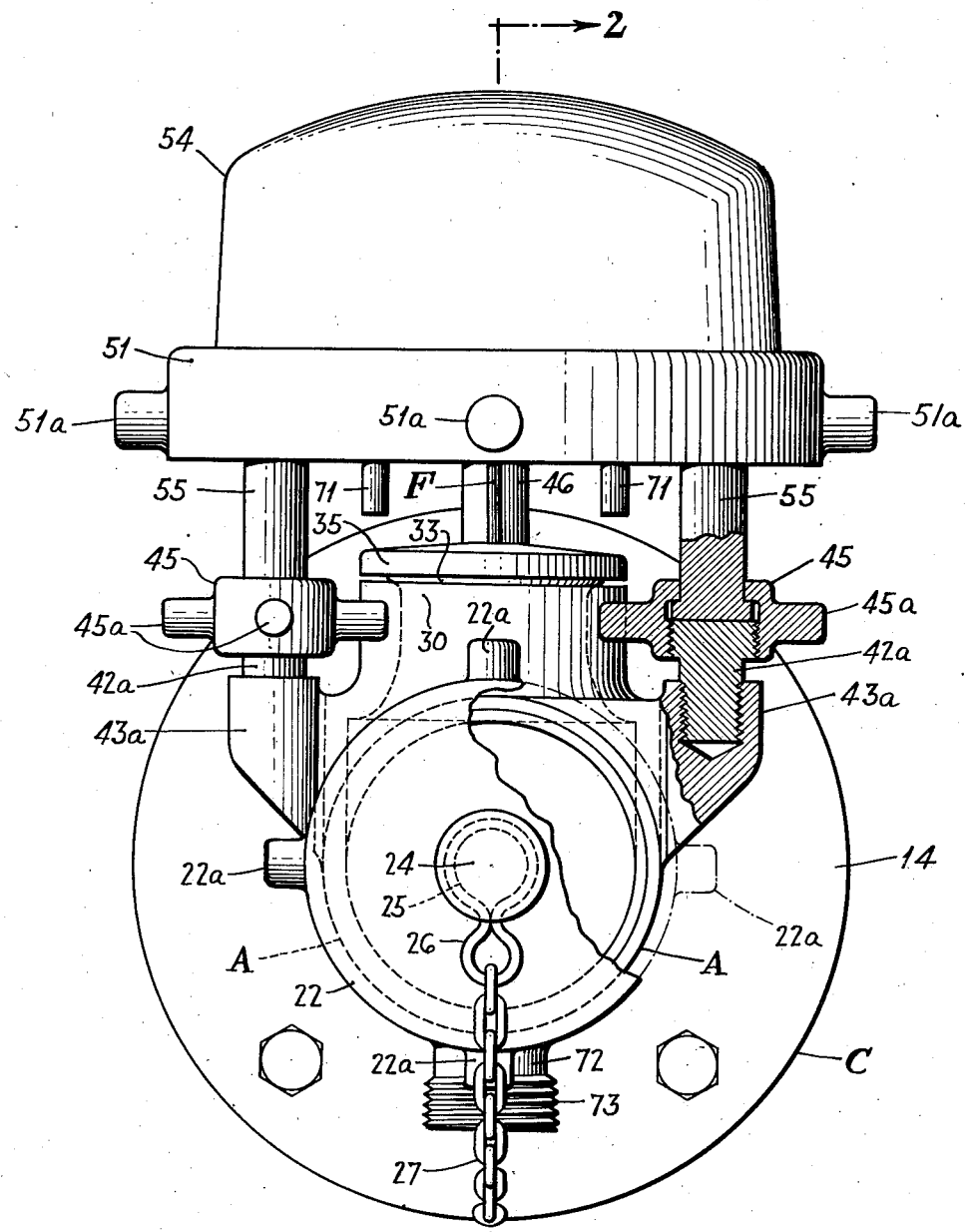

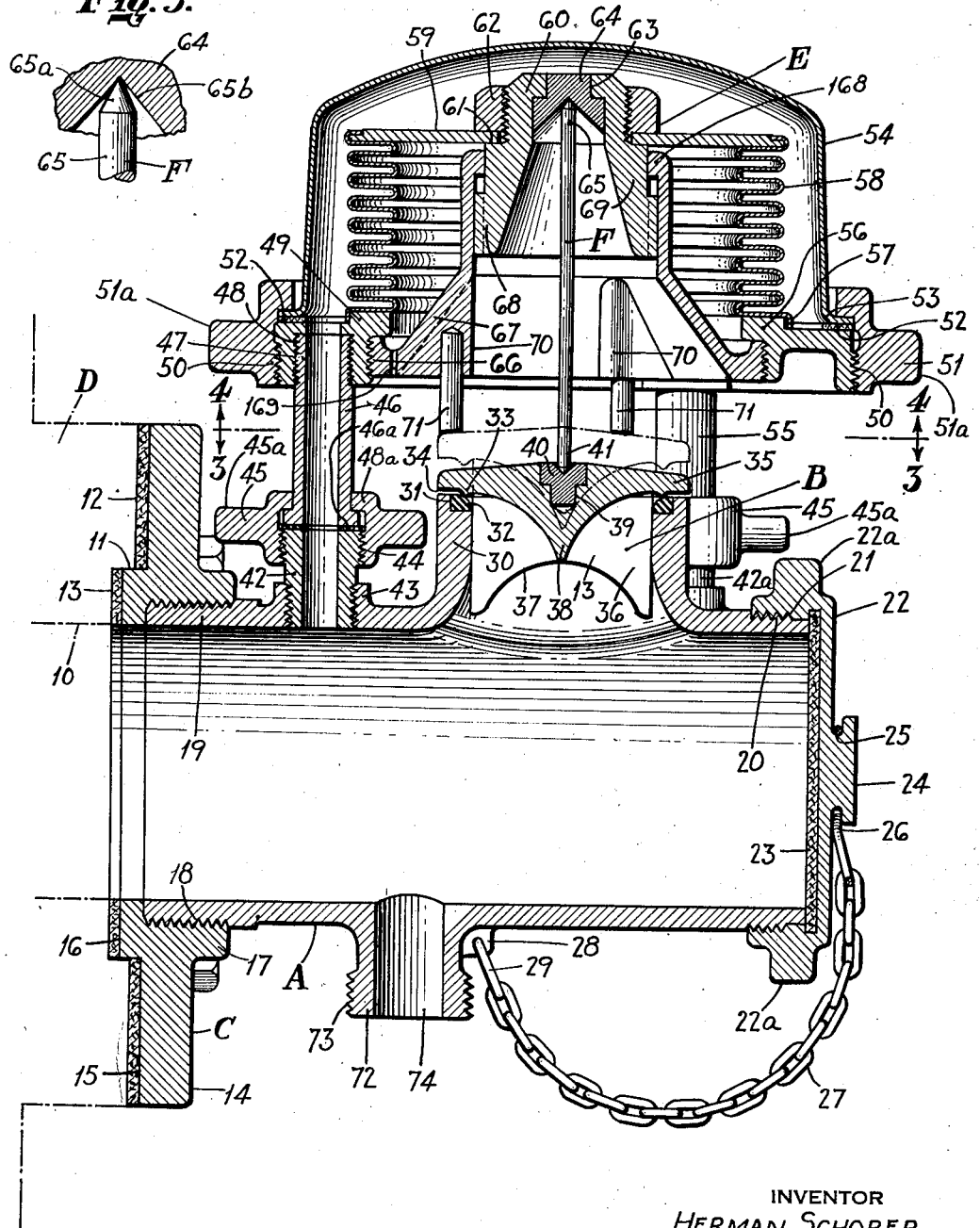

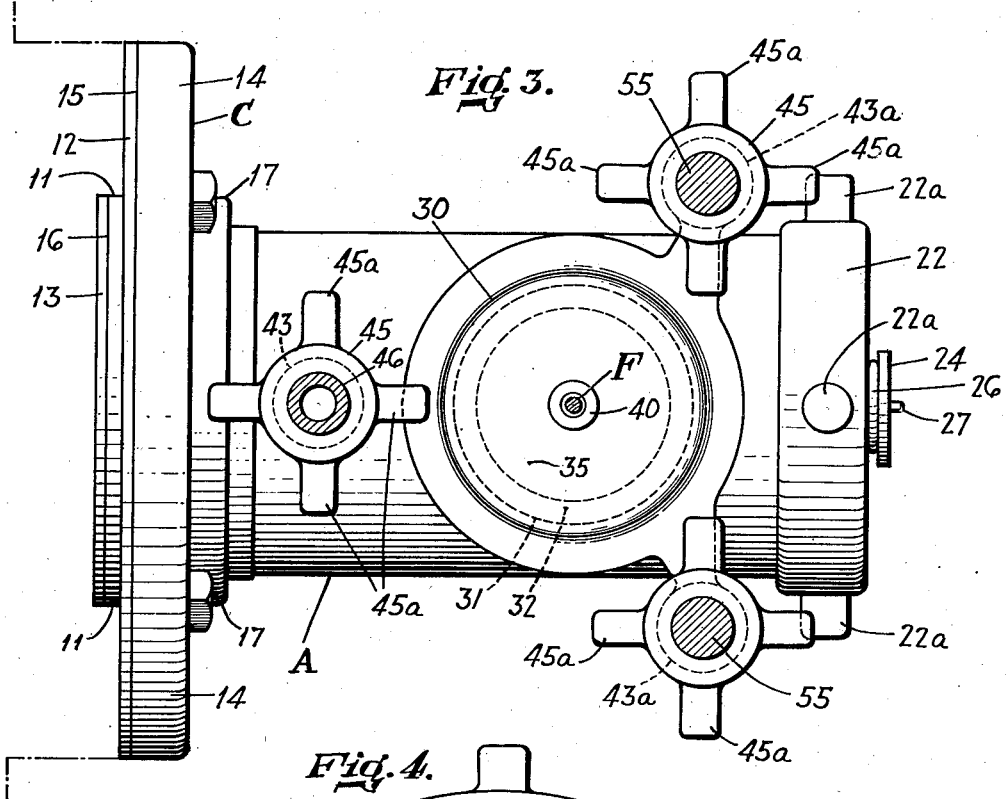
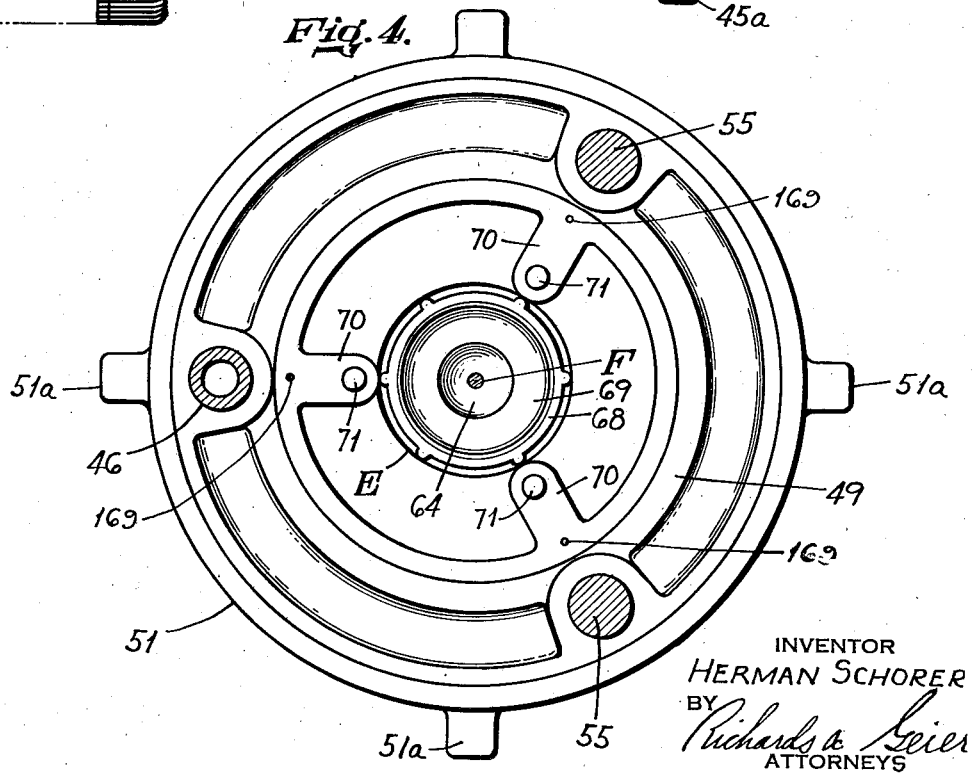

2,203,367

UNITED STATES PATENT OFFICE 2,203,367

VALVE DEVICE

Herman Schorer, Valhalla, N. Y., assignor to Borsari Tank Corporation of America, New York, N. Y., a corporation of Delaware Application November 25, 1938, Serial No. 242,191

16 Claims. (Cl. 137—53)

The present invention relates to valves and it particularly relates to safety valves which may be associated with tanks containing gases and liquids under pressure.

In many types of safety valves now employed, particularly in connection with beer storage tanks and in other pressure vessels or tanks where high gas or liquid pressure is liable to be generated, difficulty has been experienced in securing a complete release at a predetermined elevated pressure. As a general rule springs or weights if employed for this purpose may give only partial relief or the friction caused by dirt, corrosion, binding of vents, etc., may open the valves at varying pressures.

Moreover, often these springs and weights will permit the valve to crack open from its seat before the desired pressure is reached with the result that there will be an undesirable leakage of fluid or gas from the tank, and reduction of pressure.

Moreover, with springs and weights the valve may gradually open upon increase in pressure and such slow and gradual opening may cause injury to the tank structure, since it will not give full relief immediately in case of pressure surges.

It is, therefore, among the objects of the present invention to provide an improved relief valve construction which may be utilized for tanks in general and particularly for tanks in which gas pressures are liable to be generated such as beer tanks. This valve will be devoid of springs and weights, yet of inexpensive and durable construction and which valve also will open suddenly to give full relief when a critical or predetermined pressure has been reached.

Another object of the present invention is to provide an improved relief valve construction which will assure immediate and complete relief of hydraulic pressure within a tank containing liquid or gas or from a system containing a liquid or gas and which may readily be restored to initial operating position after the relief of pressure.

Other objects will be obvious or will appear during the course of the following specification.

In accomplishing the above objects, it has been found most suitable to provide a valve construction which normally will be seated by the pressure exerted by the liquid or fluid within the tank or within the piping or conduit system. For example, the valve seat may be caused to expose a certain area of the valve construction to the pressure of the liquid or gas while the valve may also be provided with a pressure valve closing element having a much greater area, for example above 2 to 3 times, subjected to the same specific pressure in the opposite direction which will assure a positive seating at all times when the valve is operating in non-relief position. In fact, the greater the pressure the tighter the valve will close.

In the preferred embodiment, in the connection between the pressure valve closing element and the small valve seating face, there is positioned a so-called mechanical element which will rupture at a predetermined pressure differential and immediately release the valve so that it may be instantaneously opened to its full extent without having the gradual opening characteristics which accompany the usual spring and weight seated relief valve.

The most satisfactory mechanical fuse element has been found to consist of a slender metal column, preferably of steel. It has been found that many different types of hard steel columns and other combinations may be employed with assurance that the valve will be immediately opened to give immediate and full relief at a predetermined pressure.

At the same time, a mechanical steel column may readily be replaced after such rupture and relief so that the process may be repeated.

The above and other objects will appear more clearly from the following detailed description which when taken in connection with the accompanying drawings, will illustrate preferred embodiments of the inventive idea.

Referring to the drawings:

Figure 1 is an end view of the valve construction with a portion of the pressure chamber support shown in section;

Figure 2 is a transverse sectional view upon the line 2—2 of Figure 1 showing the manner of attachment of the valve to a tank outlet or conduit system;

Figure 3 is a transverse sectional view upon the line 3—3 of Figure 2 showing the top of the seating valve structure;

Figure 4 is a transverse sectional view upon the line 4—4 of Figure 2 showing the other side of the valve structure;

Figure 5 is a detailed view upon enlarged scale showing the connection between the column F, the valve B and the top of the bellows E.

Referring to Figures 1 to 4, the valve consists of a main body A, a valve construction B, a flange connection C, to the tank D, a seating piston E and a mechanical element F.

The tank D is indicated diagrammatically in dot and dash lines and the passage 10 of the tank may have a recessed outlet, as indicated at 11, receiving the gaskets 12 and 13 which are held in position by the annular plate 14 which presses against the said gaskets at 15 and 16. The plate 14 is provided with a nipple 17 having a tapped portion 18 which receives a threaded nipple portion 19.

The other end of the cylindrical body A is also threaded, as indicated at 20, to receive the tapped opening 21 of the cover plate 22.

The cover plate 22 carries a gasket 23 and also a knob 24 which is grooved at 25 to receive the rein 26 of the chain 27. The cover plate 22 is also provided with the gripping lugs 22a.

The body A is also provided with a lug 28 which receives the end link 29 of the chain 27.

The top of the body A is provided with an upstanding cylindrical extension 30 which is shouldered at 31 to receive the flexible valve seating annulus 32 which cooperates with the peripheral lip 33 on the bottom 34 of the mushroom valve 35.

The valve has downwardly extending fins 36, the lower edges of which are recessed as indicated at 37, and joined together at a central point 38.

The top of the mushroom 35 is provided with a recess 39 having the hard steel insert 40 which receives a lower pointed end 41 of the mechanical element F.

Positioned above the body A is the upper pressure piston chamber E. This chamber is supported from the body A by the double threaded nipples 42 which screw into the upstanding tapped portions 43 in the body A and the lower tapped portions 44 in the tightening nut 45. The nuts 45 are provided with gripping lugs 45a.

The connecting pipe or tubing segment 46 has an outstanding collar 46a which engages the shoulder 48a on the tightening nut to clamp the pipe sections 42 and 46 together.

The pipe section 46, at its upper end, is threaded, as indicated at 47, to fit into the tapped opening 48 in the bottom member 49 of said chamber E.

The exterior of the base 49 is threaded, as indicated at 50 to receive the collar 51 which clamps in position the gasket 52 and the flange 53 of the spun dome or cover 54 to form a gas and liquid tight seal. The collar 51 is also provided with gripping lugs 51a.

The upper pressure chamber E is also supported at two other points by rods 55 and studs, as best shown in Figure 1, which are connected by nuts 45 of substantially the same construction as used in the pipe combination 42, 46.

The upper casing supported upon the shoulder or boss 56 of the base 49 by the flange 57 is the flexible bellows or Sylphon construction 58 which at its upper end is connected to the annular top plate 59.

The top plate 59 has a central opening through which projects the threaded nipple 60. The inner edge of the opening in the top plate 59 is clamped upon the shoulder 61 by the nut 62.

The nipple 60 has a central opening 63 which receives the hard metal seat 64 for the upper end 65 of the steel column or element F.

The base plate 49 also has a threaded connection at 66 to the upstanding member 67 within which fits the rib elements 68 of the element 69 carrying the nipple 60.

The rib elements 68 slide in contact with the upstanding sleeve member 67 as pressure is exerted upon the top plate 59 and the bellows 58 is expanded or contracted.

The sleeve 67 is provided with a series of bosses 70 which receive the pins 71. These pins 71 limit upward movement of the mushroom valve 35 when relief takes place.

At the bottom of the body A is a depending nipple 72 which is threaded at 73 and may be connected with a suitable pipe leading to a pressure gauge or recording instrument (not shown).

It has been found that various types of hard steel columns, even though they differ in exact composition and in their carbon or other metal content will all break at substantially the same differential pressure permitting full relief of pressure. For example, a hardened tool steel has been found to be satisfactory, and the diameter and length may be varied depending upon the pressure at which relief is desired.

This rupture of the steel rod and opening of the valve takes place in accordance with calculations based upon Euler's formula for slender columns, with pointed ends.

It has been found that the modulus of elasticity of various rods of steel does not vary greatly even though the composition of the rod be varied so that there is assurance of a predetermined breaking load at which the valve will open.

After the column F has broken and the valve has been released, a new rod may be readily placed in position by elevating the column seat 64 with the new rod F.

The bellows 58 is free to move between stops afforded by contact of the element 168 with the dish 59 or the enlarged portion 68.

Differing from most relief valves having spring seats, the valve will immediately open to its fullest extent when the rod F breaks and there will not be a gradual release of pressure. Moreover, there will be a perfect seal due to the action of the pressure upon the disk 59 until the rod has ruptured and opened the valve.

The bellows 58 will permit a certain give or play between the disk 59 and the valve 35 upon fluctuations of pressure in the tank or reservoir without injury to or interference with the safety valve.

The predetermined pressure for which the valve should be set may be readily determined and the element F then selected according to Euler's formula for slender columns which will give the size and length of column F.

Euler's formula is defined in "Mechanical Engineer's Handbook," first edition, 1916, Lionel S. Marks, (see also 3rd edition, page 478); on page 435 as P is equal to $$\frac{\pi^2 E. I.}{l^2}$$

where P is the critical load at which the column will fail by buckling, the load P being within the elastic limit (see also Marks 3rd edition, page 477. l is equal to the length of the column and I is equal to the moment of inertia.

The columns F which constitute the essential feature of the present invention are of the type defined as long slender columns (see Marks supra page 434) and generally the length of the column should be more than 10 to 20 diameters.

With such long slender columns which are broken by pressure along the axis of the column, it is found that the breaking pressure will only slightly vary although varying types of steel may be utilized to form the rod F, as is evidenced by comparison of the table upon page 384 of Marks supra, showing that the modulus of elasticity will only vary slightly, for example, from twenty eight million to thirty one million with an average of 30 million, whereas the tensile strength may vary widely as for example, from forty five thousand to two hundred and thirty two thousand (see Marks page 384 supra). It will be noted that the ends of the steel column F are mounted either pivotally or in such a manner as to permit the column F to swing laterally and to buckle in accordance with Euler's formula. The ends of the column F are in no cases rigidly connected to or screwed to the supports for the top and bottom of the column.

The conduit between the pressure chamber E and the body A is positioned in the support 46 on the center line so as to facilitate cleaning. To clean the bellows 58 the cap 54 may be removed and a brush or hose employed or the entire pressure chamber structure may be removed by couplings 45 and placed in a cleaning solution.

When the valve B is open as shown in dot and dash lines, it provides a flow outlet at least equal in capacity to the maximum filling capacity of the tank D by the pumps.

The valve inlet 10 preferably communicates with the highest point of the tank and desirably with the gas dome or gas chamber of said tank.

It will be noted that the valve is so constructed that it may be readily cleaned and rendered sanitary.

The spaced openings 169 shown in Figure 2 permit drainage of water or condensate from the interior of the bellows 58 and assure maintenance of atmospheric pressure within the bellows 58, as is also assured by the clearance beyond the enlarged portions or ribs 68.

As indicated in Figure 5, the conical end portion 65a of the column F diverges at a smaller angle than the walls of the conical socket 65b with the result that it is possible for the column F to bend slightly before rupture.

It is apparent that the specific illustrations shown above has been given by way of illustration and not by way of limitation and that the structures above described are subject to wide variation and modification without departing from the scope or intent of the invention, all of which variations and modifications are to be included within the scope of the present invention.

What is claimed is:

1. A relief valve comprising a valve body having an outlet passage with a valve seat forming part of said body, a valve closing said seat and said passage, and means to maintain said valve closed at low pressures and to permit opening of said valve at predetermined high pressures, said means including a slender column which will break within its elastic limit according to Euler's law, the ends of the column being so mounted and devoid of rigid connection as to permit lateral bulging of the entire column in accordance with Euler's formula.

2. A relief valve comprising a valve body having an outlet passage with a valve seat forming part of said body, a valve closing said seat and said passage, and means to maintain said valve closed at low pressures and to permit opening of said valve at predetermined high pressures, said means including a pressure member to close said valve and a connection including a long slender steel column between said pressure member and valve to permit said valve to open at a predetermined elevated pressure, the ends of the column being so mounted and devoid of rigid connection as to permit lateral bulging of the entire column in accordance with Euler's formula.

3. A relief valve comprising a valve body having an outlet passage with a valve seat forming part of said body, a valve closing said seat and said passage, and means to maintain said valve closed at low pressures and to permit opening of said valve at predetermined high pressures, said means including a pressure member to close said valve and a connection between said pressure member and valve to permit said valve to open at a predetermined elevated pressure, said connection consisting of a slender steel column aligned axially with the direction of movement of the valve upon opening, the ends of the column being so mounted and devoid of rigid connection as to permit lateral bulging of the entire column in accordance with Euler's formula.

4. A relief valve comprising a valve body having an outlet passage with a valve seat forming part of said body, a valve closing said seat and said passage, and means to maintain said valve closed at low pressures and to permit opening of said valve at predetermined high pressures, said means including a pressure member to close said valve and a connection between said pressure member and valve to permit said valve to open at a predetermined elevated pressure, said connection consisting of a slender steel column, the pressure exerted by the valve being directed axially of the column, the ends of the column being so mounted and devoid of rigid connection as to permit lateral bulging of the entire column in accordance with Euler's formula.

5. A relief valve comprising a valve body having an outlet passage with a valve seat forming part of said body, a valve closing said seat and said passage, and means to maintain said valve closed at low pressures and to permit opening of said valve at predetermined high pressures, said means including a pressure disk having a larger area than said valve seat and a breakable connection including a long slender steel column between said disk and valve, the ends of the column being so mounted and devoid of rigid connection as to permit lateral bulging of the entire column in accordance with Euler's formula.

6. A relief valve construction comprising a valve chamber, a pressure chamber mounted thereon, said valve chamber having an outlet port, the periphery of which is provided with a valve seat and being also provided with a valve closing said port upon engagement with said seat, and said pressure chamber being provided with a pressure element having greater area than the valve and rigid means including a long slender steel column connecting said pressure element with said valve and extending longitudinally therebetween so that the pressure will be exerted along the axis of the column, which rigid means will rupture at a predetermined elevated pressure and release said valve, the ends of the column being so mounted and devoid of rigid connection as to permit lateral bulging of the entire column in accordance with Euler's formula.

7. A relief valve construction comprising a valve chamber, a pressure chamber mounted thereon, said valve chamber having an outlet port, the periphery of which is provided with a valve seat and being also provided with a valve closing said port upon engagement with said seat, and said pressure chamber being provided with a pressure element having greater area than the valve and rigid means including a long slender steel column connecting said pressure element with said valve, which rigid means will rupture at a predetermined elevated pressure and release said valve, the ends of the column being so mounted and devoid of rigid connection as to permit lateral bulging of the entire column in accordance with Euler's formula.

8. A relief valve comprising a cylindrical body member, a nipple connection at one end of said body member, a closure at the other end of said body member, ports in the sides of said body member, a pressure chamber, a conduit from one of said ports to said pressure chamber, said pressure chamber including a pressure disk, a bellows forming a gas and liquid tight connection between said disk and pressure chamber and permitting movement of said disk and a connector socket member carried by said disk, a valve positioned at another of said ports to close the same, said valve being provided with a second connector socket member and a long slender steel rod extending between said connector socket members to be ruptured at a predetermined pressure differential between said pressure disk and said valve, the ends of the column being so mounted and devoid of rigid connection as to permit lateral bulging of the entire column in accordance with Euler's formula.

9. In a relief valve, a valve body, a pressure chamber, a plurality of posts supporting said pressure chamber on said valve body, one of said posts constituting a conduit between said valve body and said pressure chamber, a differential pressure element in said pressure chamber, having a gas and liquid tight connection with said pressure chamber, a valve associated with said valve chamber and a long slender steel rod connector between said differential pressure element and said valve, the ends of the column being so mounted and devoid of rigid connection as to permit lateral bulging of the entire column in accordance with Euler's formula.

10. In a relief valve construction, a valve member and means to keep said valve member closed until a predetermined pressure is exceeded, said means including a long slender steel rod subject to being ruptured at predetermined pressure, the ends of the column being so mounted and devoid of rigid connection as to permit lateral bulging of the entire column in accordance with Euler's formula.

11. In a relief valve construction, a valve member and means to keep said valve member closed until a predetermined pressure is exceeded, said means including a pressure chamber having a diaphragm exposed to said pressure and a breakable means including a long slender steel rod extending between said diaphragm and said valve, subject to being broken when said predetermined pressure is exceeded within the tank, the ends of the column being so mounted and devoid of rigid connection as to permit lateral bulging of the entire column in accordance with Euler's formula.

12. In a relief valve construction, a valve seat and a valve normally in closed position, and means holding said valve in closed position subject to being ruptured at a predetermined pressure including a long slender steel rod, the ends of the column being so mounted and devoid of rigid connection as to permit lateral bulging of the entire column in accordance with Euler's formula.

13. A relief valve construction comprising a valve, a valve seat and a rigid long slender steel element to hold said valve rigidly against said seat until a predetermined pressure arises, said element breaking at said predetermined pressure to permit a full release, the ends of the column being so mounted and devoid of rigid connection as to permit lateral bulging of the entire column in accordance with Euler's formula.

14. In a springless relief valve construction, a valve seat, a valve closing said seat, a long slender steel rod and means to press said steel rod against said valve and said valve against said seat, the ends of the column being so mounted and devoid of rigid connection as to permit lateral bulging of the entire column in accordance with Euler's formula.

15. In a springless relief valve construction, a valve seat, a valve closing said seat, a long slender steel rod and means to press said steel rod against said valve and said valve against said seat, said means being subjected to the same pressure as the valve and having a larger pressure area than said valve, the ends of the column being so mounted and devoid of rigid connection as to permit lateral bulging of the entire column in accordance with Euler's formula.

16. A pressure limiting device comprising a support, a valve device arranged to reciprocate toward and away from said support, a seat for said valve and a slender long metal column extending between said support and said valve to hold said valve against said seat, said column breaking in accordance with Euler's formula, the ends of the column being so mounted and devoid of rigid connection as to permit lateral bulging of the entire column in accordance with Euler's formula.

HERMAN SCHORER.